US008305881B2

(12) United States Patent
Harby et al.

(10) Patent No.: US 8,305,881 B2
(45) Date of Patent: Nov. 6, 2012

(54) METHOD AND SYSTEM FOR MAXIMIZING WAVELENGTH REUSE IN OPTICALLY PROTECTED WDM NETWORKS

(75) Inventors: Robert S. Harby, Fair Haven, NJ (US); David S. Levy, Bedminster, NJ (US); Dat D. Ngo, Howell, NJ (US); James Dorian Sandoz, Keyport, NJ (US); Charles Small, Freehold, NJ (US)

(73) Assignee: Alcatel Lucent, Paris (FR)

( * ) Notice: Subject to any disclaimer, the term of this patent is extended or adjusted under 35 U.S.C. 154(b) by 1855 days.

(21) Appl. No.: 10/919,618

(22) Filed: Aug. 17, 2004

(65) Prior Publication Data

US 2006/0039278 A1 Feb. 23, 2006

(51) Int. Cl.
*H04B 10/17* (2006.01)
*H04B 10/08* (2006.01)
*H04B 10/12* (2006.01)
*H04J 14/02* (2006.01)

(52) U.S. Cl. .................. 370/223; 398/5; 398/7
(58) Field of Classification Search .......... 370/216–228; 398/59, 1–8; 714/716–717
See application file for complete search history.

(56) References Cited

U.S. PATENT DOCUMENTS

| | | | | |
|---|---|---|---|---|
| 6,567,194 | B1 * | 5/2003 | Badr | 398/1 |
| 7,046,619 | B2 * | 5/2006 | Alagar et al. | 370/216 |
| 7,272,307 | B2 * | 9/2007 | Fang | 398/4 |
| 2002/0194339 | A1 * | 12/2002 | Lin et al. | 709/226 |
| 2002/0197007 | A1 * | 12/2002 | Liu | 385/24 |
| 2004/0001711 | A1 * | 1/2004 | Koster et al. | 398/40 |
| 2004/0179472 | A1 * | 9/2004 | Khalilzadeh et al. | 370/227 |
| 2004/0205237 | A1 * | 10/2004 | Doshi et al. | 709/241 |
| 2004/0205239 | A1 * | 10/2004 | Doshi et al. | 709/241 |
| 2004/0246892 | A1 * | 12/2004 | Elie-Dit-Cosaque et al. | 370/216 |
| 2005/0175346 | A1 * | 8/2005 | Takeguchi et al. | 398/83 |
| 2005/0237950 | A1 * | 10/2005 | Yuan et al. | 370/255 |
| 2006/0039696 | A1 * | 2/2006 | Saniee et al. | 398/3 |
| 2006/0051090 | A1 * | 3/2006 | Saniee et al. | 398/59 |

FOREIGN PATENT DOCUMENTS

EP 0949777 A2 * 10/1999
EP 0977394 A2 * 2/2000

OTHER PUBLICATIONS

Anderson et al (Reid Anderson, Fan Chung, Arunabha Sen, Guoliang Xue, "On Disjoint Path Pairs with Wavelength Continuity Constraint in WDM Networks", IEEE, Mar. 7-11, 2004).*

* cited by examiner

*Primary Examiner* — Habte Mered
(74) *Attorney, Agent, or Firm* — Wall & Tong LLP

(57) ABSTRACT

A method and system for maximizing wavelength reuse in an optically protected wavelength-division-multiplexed (WDM) network, the WDM network supporting a plurality of service connections, includes associating service connections supported by non-overlapping paths to form respective service channel groups, and for each service channel group, assigning at least one common wavelength channel for establishing the service connections. In addition, for each of said groups, at least one common wavelength channel is assigned for establishing a shared protection path for the service connections of each of said groups. In addition, the wavelength channels assigned for establishing the shared protection paths for each of the groups may be used for providing service connections for the WDM network when not in use as shared protection paths. However such provisional service connections are dropped when the wavelength channels are needed to establish shared protection paths. Such provisional service connections may be offered at reduced cost.

11 Claims, 12 Drawing Sheets

METHOD AND SYSTEM FOR MAXIMIZING WAVELENGTH REUSE IN OPTICALLY PROTECTED WDM NETWORKS

FIELD OF THE INVENTION

This invention relates generally to the field of data communication in optically protected networks and, more specifically, to maximizing wavelength reuse in optically protected wavelength division multiplexed (WDM) networks.

BACKGROUND OF THE INVENTION

Protection schemes are generally categorized based on whether a redundant channel or path is always available or only available when a failure occurs. In protection schemes, if information is switched from a working channel to a protection channel or working path to a protection path only when a failure occurs, the schemes are referred to as one for one (1:1) protection schemes. In protection schemes, if a protection path or channel is always available and a destination node has the option of choosing which path or channel to use to communicate the information, the schemes are referred to as one plus one (1+1) protections schemes. In "1:1" schemes, either the working channel is switched to a protection path or the information is switched to a protection channel on the protection path. Furthermore, in conventional "1:1" schemes, path protection can be performed if at least one redundant path is available between the origin and destination nodes, and for a path to be fully protected, there must not be any common links in the redundant paths.

Most path protection schemes are generally analogous to two classes of ring protection schemes. The first class of protection schemes is referred to as Bi-directional Line-Switched Ring ("BLSR") in SONET, or Multiplex section-Shared Protection Ring ("MS-SPRing") in synchronous digital hierarchy (SDH). The second class is known as Unidirectional Path-Switched Ring ("UPSR") in synchronous optical networks (SONET), or Dedicated Protection Ring ("DPRing") in SDH. BLSR and UPSR schemes can be implemented using two or more fibers interconnecting nodes, which either electrically or optically switch traffic between the working and protection paths established by fiber rings.

In BLSR schemes, working channels for each direction connecting two nodes are transmitted on different rings in the same working path. Protection for the working channels is provided using one or more different rings in a common protection path. In UPSR schemes, different working paths for each direction are provided on the same ring and the protection paths are provided on other rings. The protection path in one direction is common with the working path in the other direction.

In the event of a failure of the working path, a destination node for the traffic will switch to the protection path to receive the traffic. In 1:1 schemes, an origin node for the traffic and/or other nodes between the origin and destination node will also switch the traffic to the protection path to route traffic around the failure.

As the demand for transmission capacity continues to grow, there is an increasing need to efficiently use the available transmission capacity and protect the information being transported through the systems. In addition, the increased amount of traffic being carried on each fiber places increased importance on the ability to effectively protect the information, because each failure results in higher revenue losses for service providers. However, currently deployed protection systems have their disadvantages. For example, the protection schemes described above do not allow for wavelength reuse. Once a wavelength channel ($\lambda_x$) is selected and assigned to a particular client, that wavelength is dedicated solely for that particular client. No other client on the DWDM ring may use that specific wavelength. More particularly, there is no allowance for the sharing of wavelengths among clients.

Accordingly, there is a need for optical transmission systems and protection schemes that provide effective protection with increasing wavelength efficiencies for use in long distance communication systems.

SUMMARY OF THE INVENTION

The present invention addresses various deficiencies of the prior art by providing a method and system for maximizing wavelength reuse in optically protected WDM networks.

In one embodiment of the present invention, a method for allocating a plurality of wavelength channels within an optically protected wavelength-division-multiplexed (WDM) network, the WDM network supporting a plurality of service connections, includes associating service connections supported by non-overlapping paths to form respective service channel groups, and for each service channel group, assigning at least one common wavelength channel for establishing the service connections. Non-overlapping paths are defined by the inventors as service connections that do not have any paths or portions of paths in common. The method further includes assigning at least one common wavelength channel for establishing a shared protection path for the service connections of each service channel group.

In an alternate embodiment of the present invention an optically protected wavelength-division-multiplexed network includes a plurality of nodes, the nodes intercommunicating via a plurality of available wavelength channels and a control unit including a memory for storing program instructions and a processor for executing the instructions, the control unit being adapted to perform the steps of associating service connections supported by non-overlapping paths to form respective service channel groups, and for each service channel group, assigning at least one common wavelength channel for establishing the service connections.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention advantageously provides a method, apparatus and network for maximizing wavelength reuse in optically protected wavelength division multiplexed (WDM) networks. Although various embodiments of the present invention are described herein with respect to a four-node, two fiber DWDM ring network implementing a 1:1 protection scheme, the specific embodiments of the present invention should not be treated as limiting the scope of the invention. It will be appreciated by those skilled in the art informed by the teachings of the present invention that the concepts of the present invention may be advantageously applied in various other optically protected networks comprising substantially any number of nodes implementing various other protection schemes.

Figure 1:
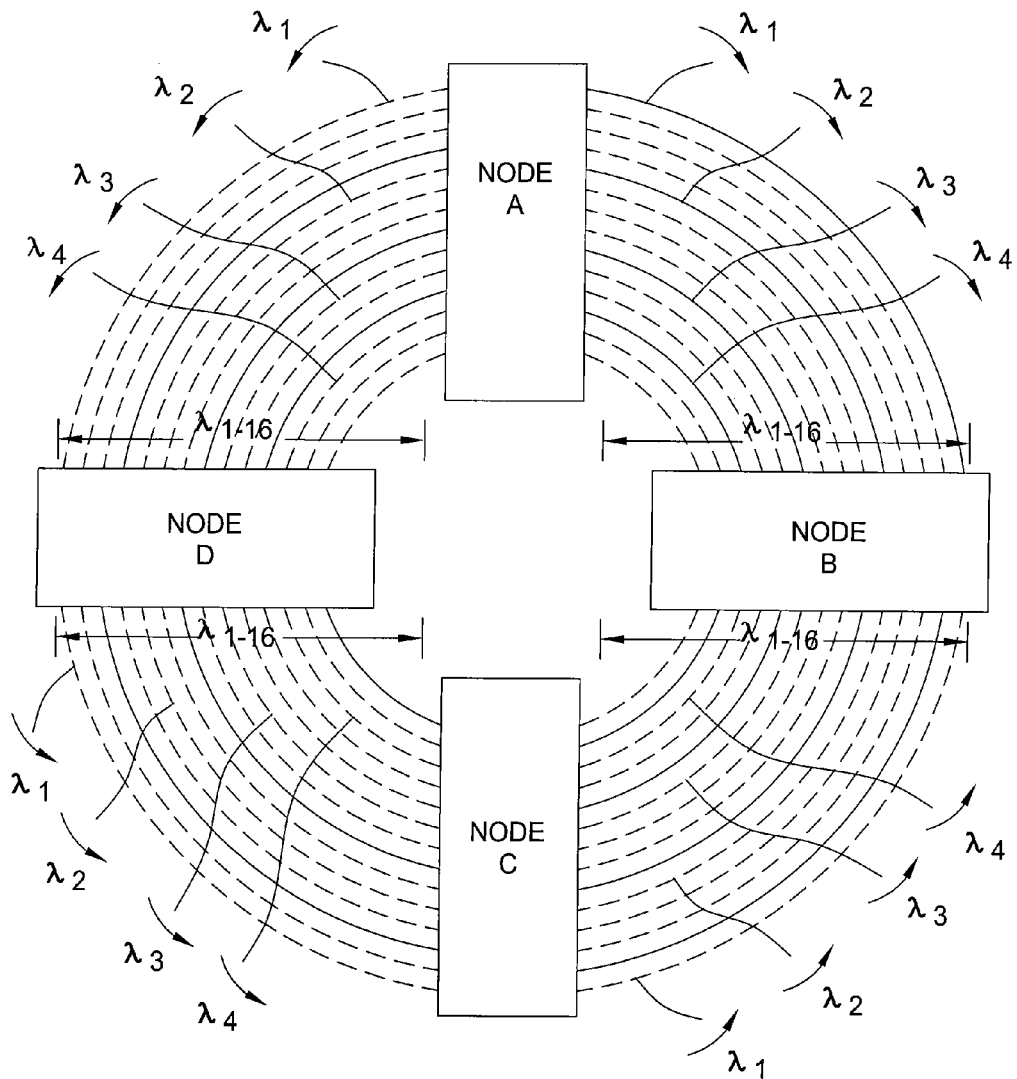
FIG. 1 depicts a high level block diagram of a prior art optically protected dense wavelength division multiplexed (DWDM) network.

FIG. 1 depicts a high level block diagram of a prior art optically protected dense wavelength division (DWDM) network. The prior art DWDM network 100 of FIG. 1 illustratively comprises four nodes A, B, C, D and sixteen service wavelengths $\lambda_1$-$\lambda_{16}$. In the prior art DWDM network 100 of FIG. 1, a 1:1 protection scheme is implemented. In addition, in the prior art DWDM network 100 depicted in FIG. 1, the solid lines represent service paths and the dashed lines represent protection paths. In the DWDM network 100 of FIG. 1, traffic is added and dropped at every node and all nodes in the ring add and drop the same amount of traffic. Traffic patterns in such networks are defined as next-neighbor (i.e., traffic never has to span more than two nodes). As such, the traffic pattern of the DWDM network 100 of FIG. 1 may be characterized according to Table 1, which follows:

TABLE 1

| Connection Paths | Number of Connections (users) | Wavelength ID | Number of Required OT's for 1:1 protection |
| --- | --- | --- | --- |
| A ←→ B | 4 | λ1, λ2, λ3, λ4 | 8 for service<br>8 for protection<br>8 for pass-through |
| B ←→ C | 4 | λ5, λ6, λ7, λ8 | 8 for service<br>8 for protection<br>8 for pass-through |
| C ←→ D | 4 | λ9, λ10, λ11, λ12 | 8 for service<br>8 for protection<br>8 for pass-through |
| D ←→ A | 4 | λ13, λ14, λ15, λ16 | 8 for service<br>8 for protection<br>8 for pass-through |

Table 1 above depicts sixteen different connections for the sixteen available wavelength channels of the DWDM network 100 of FIG. 1. Each connection uses a different wavelength, therefore, the sixteen wavelength channels $\lambda_1$-$\lambda_{16}$ available in the DWDM network 100 are consumed to offer these sixteen services. For example suppose a first customer, 1, has traffic needing to be communicated from Node A to Node B. As such, the first customer 1 uses a first wavelength, for example $\lambda_1$, for communicating the desired traffic from Node A to Node B. The offered service connection is from Node A to Node B and additionally a protection path (1:1) is provided from Node A through Node D through Node C to Node B also using the first wavelength, $\lambda_1$. In the prior art DWDM network 100 of FIG. 1, no other customer on the ring may use the wavelength $\lambda_1$, as it is dedicated to servicing traffic from Node A to Node B for the first customer 1 or for providing the protection path for the first customer 1 from Node A through Node D through Node C to Node B if the primary service connection path from Node A to Node B using the first wavelength, $\lambda_1$, should fail. In the connection path A←→B of the prior art DWDM network 100 of FIG. 1, there are also illustratively three other connections for three additional customers 2, 3 and 4. Each of these three additional connections is also assigned its own respective wavelength, $\lambda_2$, $\lambda_3$ and $\lambda_4$, for providing the service connections for the traffic from the customers 2, 3 and 4. The wavelengths, $\lambda_2$, $\lambda_3$ and $\lambda_4$, are also implemented for providing respective protection paths for the additional customers 2, 3 and 4 as described above for the first customer 1 using the first wavelength, $\lambda_1$. For example, the DWDM network 100 of FIG. 1 depicts the associated wavelength channels, $\lambda_2$, $\lambda_3$ and $\lambda_4$, for respectively servicing traffic from Node A to Node B for customers 2, 3 and 4 and for providing the respective protection paths from Node A through Node D through Node C to Node B for those customers also using the wavelength channels, $\lambda_2$, $\lambda_3$ and $\lambda_4$. The DWDM network 100 of FIG. 1 similarly uses twelve additional wavelength channels, $\lambda_5$-$\lambda_{16}$, for providing the service connections and protection paths for twelve other customers (i.e., another four customers between each two remaining neighboring nodes) as depicted in Table 1 above. For example, four wavelength channels, $\lambda_5$-$\lambda_8$, are used to service traffic from Node B to Node C for four customers (i.e., customers 5, 6, 7 and 8), four wavelength channels, $\lambda_9$-$\lambda_{12}$, are used to service traffic from Node C to Node D for four customers (i.e., customers 9, 10, 11 and 12), and four wavelength channels, $\lambda_{13}$-$\lambda_{16}$, are used to service traffic from Node D to Node A for four customers (i.e., customers 13, 14, 15 and 16). In addition, the wavelength channels, $\lambda_5$-$\lambda_{16}$ are used to provide respective protection paths between the Nodes A, B, C and D for the respective customers (connections). Because in the prior art DWDM network 100 of FIG. 1 only sixteen wavelength channels are capable of being supported, the network usage of the prior art DWDM network 100 is maximized as shown in FIG. 1.

As described above, under the 1:1 protection scheme used in the prior art DWDM network 100 of FIG. 1, each customer (i.e. each connection) is given a dedicated wavelength channel for service and protection. As such and in order to protect against equipment failures, each customer requires two service optical transceivers (OTs) for the working path, and two protection OTs for the protection path. For example, for the first customer's connection between Node A and Node B, the required OTs are located on Node A and Node B. In addition, Node D will require a pass-thru OT and Node C will also require a pass-thru OT to pass-thru the protection channels. Therefore, the total number of required OTs for the wavelength channel, $\lambda_1$, used for servicing traffic between Node A and Node B for the first customer 1 is six (four regular OT's and two pass-thru OTs). With sixteen customers (i.e., connections), the total number of required OTs in the DWDM network 100 of FIG. 1 is ninety-six when using a 1:1 protection scheme.

Figure 2:
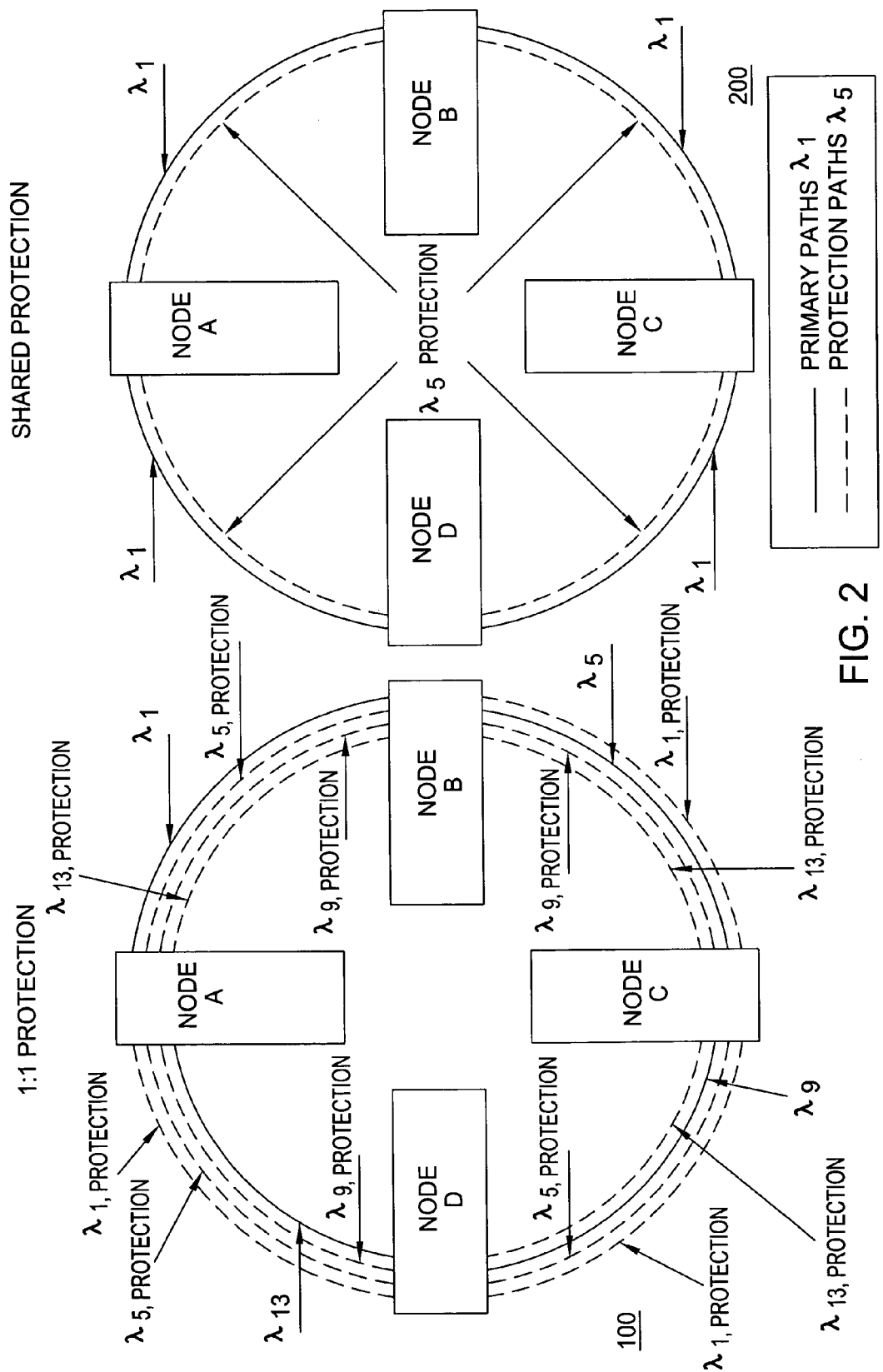
FIG. 2 depicts a high level block diagram of an optically protected DWDM network implementing a shared protection scheme according to one embodiment of the present invention.

FIG. 2 depicts a high level block diagram of an optically protected DWDM network implementing a shared protection scheme according to one embodiment of the present invention. The DWDM network 200 of FIG. 2 illustrates an embodiment of wavelength grouping in accordance with the present invention. More specifically, the DWDM network 200 of FIG. 2 comprises four nodes A, B, C, D communicating using next-neighbor traffic patterns (i.e., traffic never has to span more than two nodes). To assist in the explanation of the shared protection scheme of the present invention, the prior art DWDM network 100 is also depicted in FIG. 2. However, in the DWDM network 100 depicted in FIG. 2, only a first group of four wavelength channels, $\lambda_1$, $\lambda_5$, and $\lambda_{13}$, which represent the service and protection connections for four connections (customers), one connection between each of the pairs of neighboring nodes, is depicted. The four wavelength channels, $\lambda_1$, $\lambda_5$, $\lambda_9$ and $\lambda_{13}$, depicted in the DWDM network 100 of FIG. 2 however are not randomly grouped but are grouped in accordance with the present invention as connections that do not have overlapping paths, which is described in detail below. Although in FIG. 2, the concepts of the present invention are being described with respect to a DWDM network, it will be appreciated by those skilled in the art informed by the teachings of the present invention, that the concepts of the present invention may be applied to optically protected networks implementing other multiplexing schemes, such as conventional wavelength division multiplexing (WDM) or coarse wavelength division multiplexing (CWDM) schemes.

In the DWDM network 200 depicted in FIG. 2, the solid lines represent service paths and the dashed lines represent protection paths. As depicted in FIG. 2, in the DWDM network 200 of the present invention, the same four service connections and protection paths serviced in the prior art DWDM network 100 by the four wavelength channels, $\lambda_1$, $\lambda_5$, $\lambda_9$ and $\lambda_{13}$, are now established using only two wavelength channels (illustratively wavelength channels $\lambda_1$, and $\lambda_5$). More specifically, in the DWDM network, the four depicted service paths, one connection between each of the pairs of neighboring nodes, are illustratively able to be serviced by $\lambda_1$ while the protection paths are established using the wavelength, $\lambda_5$.

The inventors determined that connections that do not have path overlap (i.e., service connections that do not have a path or a portion of a path in common) are able to be grouped and serviced by a wavelength channel in common. More specifically, for the DWDM network 200 depicted in FIG. 2 above, the service connections for the single customer between each two neighboring nodes are grouped and serviced by a wavelength channel in common because they do not have path overlap. That is, the service connections for the customers are able to be grouped and serviced by a wavelength channel in common because the service connection between Node A and Node B does not interfere with the service connection between Node B and Node C, which do not interfere with the service connection between Node C and Node D, which also do not interfere with the service connection between Node D and Node A because the service connection paths between Nodes A to B, B to C, C to D, and D to A do not overlap and thus, a wavelength channel in common may be used to support each of the service connections. Therefore, the four connections previously serviced and protected by the four wavelength channels, $\lambda_1$, $\lambda_5$, $\lambda_9$ and $\lambda_{13}$, under the 1:1 protection scheme of the prior art DWDM network 100 are reduced to a smaller number of required wavelength channels by grouping the connections together in accordance with the present invention. As such, the same four connections are serviced and protected by the wavelength channels $\lambda_1$ and $\lambda_5$ under the shared protection scheme of the present invention. More specifically, the first wavelength channel, $\lambda_1$, is used for providing the four grouped, non-overlapping service connections (e.g., a connection from Node A to Node B, a connection from Node B to Node C, a connection from Node C to Node D, and a connection from Node D to Node A). That is, Node A establishes its service connection to Node B using the wavelength channel $\lambda_1$, Node B establishes its service connection to Node C using the wavelength channel $\lambda_1$, Node C establishes a service connection to Node D using the wavelength channel $\lambda_1$, and Node D establishes its service connection to Node A using the wavelength channel $\lambda_1$. Therefore, the remaining wavelength channels, $\lambda_9$ and $\lambda_{13}$ are made available for servicing other connections.

In the shared protection scheme of the present invention, the second wavelength, $\lambda_5$, is used for providing the protection paths for the four connections. More specifically, the second wavelength, $\lambda_5$, is used to provide a protection path for the connection between Node A and Node B by providing a communication path from Node A, thru Node D, thru Node C, to Node B. Similarly, the second wavelength, $\lambda_5$, is also used for providing the protection paths for the remaining three connections. More specifically, the second wavelength, $\lambda_5$, is used to provide a protection path for the connection between Node B and Node C by providing a communication path from Node B, thru Node A, thru Node D, to Node C, and provides a protection path for the connection between Node C and Node D by providing a communication path from Node C, thru Node B, thru Node A, to Node D and provides a protection path for the connection between Node D and Node A by providing a communication path from Node D, thru Node C, thru Node B, to Node A. However, in the shared protection scheme of the present invention, because a single wavelength is used to provide a protection path for several service connections, more than one service connection is not able to be protected simultaneously (e.g., if the service connections between A and B and also between B and C fail, then the assigned "shared" protection path wavelength channel can only be used to provide a protection path for one of the failed service connections. As such, the shared protection scheme of the present invention may be better described as a 1:N protection scheme.

Figure 3:
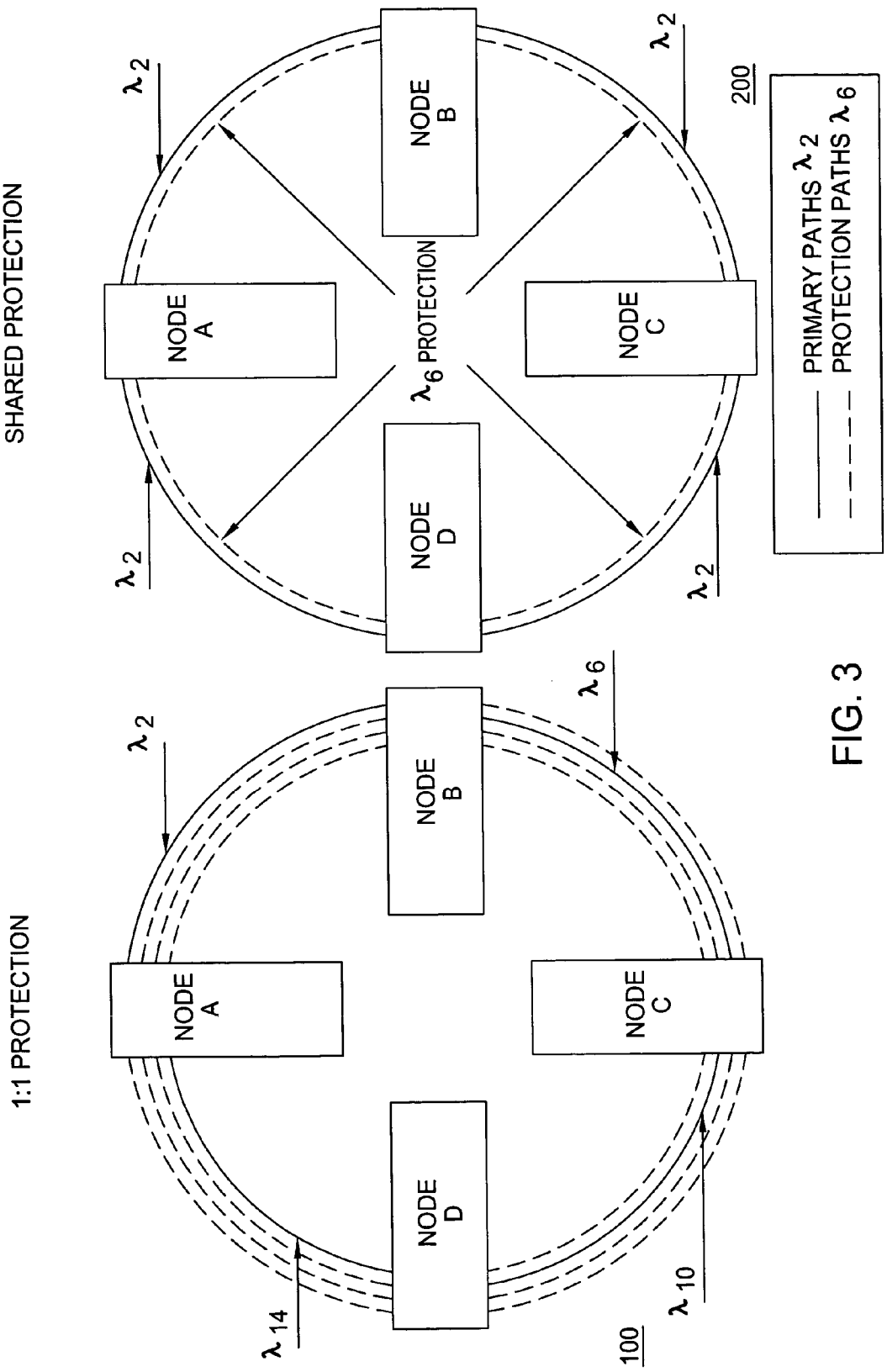
FIG. 3 depicts the DWDM network of FIG. 2 implementing an embodiment of a shared protection scheme of the present invention with reference to a second group of wavelength channels grouped according to one embodiment of the present invention.

FIG. 3 depicts the DWDM network 200 of FIG. 2 implementing an embodiment of a shared protection scheme of the present invention with reference to a second group of wavelength channels grouped according to one embodiment of the present invention. That is, as before, connections that do not have path overlap are able to be grouped and serviced by a wavelength channel in common. Again, to assist in the explanation of the shared protection scheme of the present invention, the prior art DWDM network 100 is also depicted in FIG. 3. However, in the DWDM network 100 depicted in FIG. 3, a second group of four wavelength channels, $\lambda_2$, $\lambda_6$, $\lambda_{10}$ and $\lambda_{14}$, which represent the service and protection connections for a different customer between each two neighboring nodes, is depicted.

In the DWDM network 200 depicted in FIG. 3, the solid lines represent service paths and the dashed lines represent protection paths. As depicted in FIG. 3, in the DWDM network 200 of the present invention, the same four service connections and protection paths provided in the prior art DWDM network 100 by the four wavelength channels, $\lambda_2$, $\lambda_6$, $\lambda_{10}$ and $\lambda_{14}$, under the 1:1 protection scheme of the prior art DWDM network 100 are again established using only two wavelength channels (illustratively wavelength channels $\lambda_2$ and $\lambda_6$). More specifically, in the DWDM network 200 of FIG. 3, the four depicted service paths, one connection between each of the pairs of neighboring nodes, are able to be serviced by $\lambda_2$ while the protection paths are established using the wavelength, $\lambda_6$.

As before, connections that do not have path overlap are able to be grouped and serviced by a wavelength channel in common. Therefore, the four connections serviced and protected by the four wavelength channels, $\lambda_2$, $\lambda_6$, $\lambda_{10}$ and $\lambda_{14}$, under the 1:1 protection scheme of the prior art DWDM network 100 are serviced by grouping the connections together in accordance with the present invention. As such, the same four connections are serviced and protected by the wavelength channels $\lambda_2$ and $\lambda_6$ under the shared protection scheme of the present invention. Therefore, the remaining wavelength channels, $\lambda_{10}$ and $\lambda_{14}$ are made available for servicing other connections.

The remaining wavelength channels, $\lambda_3$, $\lambda_7$, $\lambda_{11}$, $\lambda_{15}$ and $\lambda_4$, $\lambda_8$, $\lambda_{12}$, $\lambda_{16}$, in the DWDM network 100 of FIG. 1, as described in Table 1, may be similarly grouped in the DWDM network 200 of FIG. 2 in accordance with the present invention into two groups of four, for example $\lambda_3$, $\lambda_7$, $\lambda_{11}$, $\lambda_{15}$ and $\lambda_4$, $\lambda_8$, $\lambda_{12}$, $\lambda_{16}$, as described above and the number of wavelength channels required for providing the service connections and protection paths for each group of four wavelength channels may again be reduced to two wavelength channels for each group.

The shared protection scheme of the present invention reduces the number of required wavelength channels required to service sixteen customers (i.e., connections) in a DWDM network, such as the prior art DWDM network 100 of FIG. 1, from sixteen wavelength channels to eight wavelength channels. In addition, the number of required OTs for servicing sixteen customers in a DWDM network, such as the prior art DWDM network 100 of FIG. 1, is reduced from ninety-six to sixty-four. Such a reduction in the number of OTs required to service a specific number of connections, in accordance with the present invention, results in a large reduction in cost for implementing a DWDM network.

Although various embodiments of the present invention were describe above with reference to a DWDM network comprising four nodes, the concepts of the present invention may be applied in networks comprising substantially any number of nodes, where as the number of nodes in the network becomes larger, the benefits of the shared protection scheme in accordance with the present invention will also increase. In addition, although in the embodiments of the present invention depicted above hypothetical traffic patterns are presented and analysis of what it takes to implement the shared protection scheme of the present invention is presented, in other instances, customers may want to have traffic communicated from Node A through Node B to Node C or from Node A through Node D to Node C and other such combinations. As such, other combinations of service connections and their associated respective wavelength channels may be needed to be grouped together in accordance with the present invention for providing the shared protection scheme of the present invention.

Figure 4:
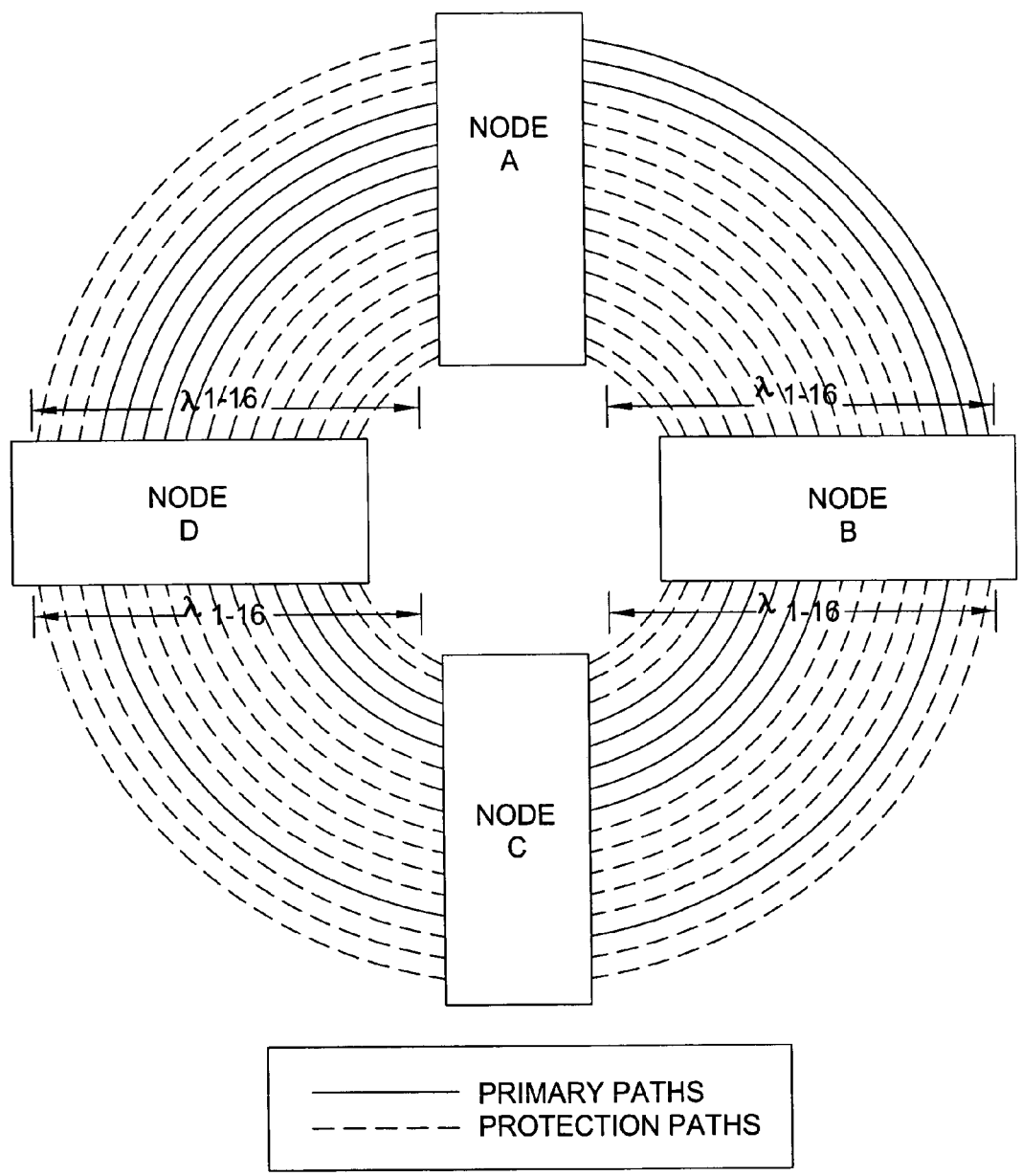
FIG. 4 depicts a high level block diagram of a prior art optically protected DWDM network where not all traffic is next-neighbor.

The shared protection scheme of the present invention may also be applied in a second scenario of data communication in a network in which some traffic typically spans three or more nodes. For example, FIG. 4 depicts a high level block diagram of a prior art DWDM network 400 comprising four nodes A, B, C, D and sixteen service wavelength channels $\lambda_1$-$\lambda_{16}$. The prior art DWDM network 400 of FIG. 4 is substantially similar to the prior art DWDM network 100 of FIG. 1 with the exception that in the prior art DWDM network 400 of FIG. 4, not all traffic is next-neighbor (i.e., some traffic spans at least three nodes). The prior art network 400 of FIG. 4 illustratively implements a 1:1 protection scheme as implemented in the prior art DWDM network 100 of FIG. 1. The traffic pattern of the prior art network 400 of FIG. 4 may be characterized according to Table 2, which follows:

TABLE 2

| Connection Paths | Number of Connections (users) | Wavelength ID | Number of Required OT's for 1:1 protection |
|---|---|---|---|
| A ←→ B | 2 | λ1, λ2 | 4 for service<br>4 for protection<br>4 for pass-through on Nodes D and C |
| A ←→ C | 2 | λ3, λ4 | 4 for service<br>4 for protection<br>4 for pass-through on Nodes D and B |
| A ←→ D | 4 | λ5, λ6, λ7, λ8 | 8 for service<br>8 for protection<br>8 for pass-through on Nodes B and C |
| B ←→ C | 3 | λ9, λ10, λ11 | 6 for service<br>6 for protection<br>6 for pass-through on Nodes D and A |
| B ←→ D | 2 | λ12, λ13 | 4 for service<br>4 for protection<br>4 for pass-through on Nodes A and C |
| C ←→ D | 3 | λ14, λ15, λ16 | 6 for service<br>6 for protection<br>6 for pass-through on Nodes B and A |

Table 2 above depicts sixteen different connections for the sixteen available wavelength channels of the prior art network 400 of FIG. 4. Under the 1:1 protection scheme, each connection is assigned a dedicated wavelength channel as depicted in Table 2 above. That is, for example, if a first customer 1 has traffic needing to be communicated from Node A to Node B, the first customer 1 is assigned a specific wavelength channel, for example, wavelength channel $\lambda_1$. The service provided for the first customer 1 is from Node A to Node B, and the protection path (1:1) is from Node A, thru Node D, thru Node C to Node B. As such, no other customer (connection) on the ring may use the wavelength channel $\lambda_1$ (i.e., wavelength channel $\lambda_1$ is dedicated to servicing and protecting traffic for customer A only). In the prior art network 400 of FIG. 4 within the connection path A←−→B, there is one other connection. This connection is also assigned its own wavelength channel, $\lambda_2$, as depicted in FIG. 4 and Table 2, above.

The DWDM network 400 of FIG. 4 further implements the wavelength channels $\lambda_3$-$\lambda_{16}$ for providing service and protection connections for an additional twelve customers (connections) as depicted in Table 2 above. For example, although not explicitly shown, two wavelength channels, $\lambda_3$ and $\lambda_4$, are dedicated for servicing traffic from Node A to Node C for respective customers C, and D and for providing the respective protection paths from Node A through Node B to Node C also using the respective dedicated wavelength channels, $\lambda_3$ and $\lambda_4$ should the primary service paths fail. In addition, four wavelength channels, $\lambda_5$-$\lambda_8$, are used to service traffic from Node A to Node D for four customers, three wavelength channels, $\lambda_9$-$\lambda_{11}$, are used to service traffic from Node B to Node C for three customers, two wavelength channels, $\lambda_{12}$-$\lambda_{13}$, are used to service traffic from Node B to Node D for two customers and three wavelength channels, $\lambda_{14}$-$\lambda_{16}$, are used to service traffic from Node C to Node D for three customers. In addition, the respective wavelength channels, $\lambda_5$-$\lambda_{16}$ are used to provide protection paths between the Nodes for the respective customers should the respective primary service paths fail. Because in the prior art DWDM network 400 of FIG. 4 only sixteen wavelength channels are capable of being supported, the network usage of the prior art network 400 is maximized as depicted in FIG. 4. In the prior art network 400 depicted in FIG. 4, the solid lines represent service paths and the dashed lines represent protection paths.

As described above, under the 1:1 protection scheme used in the prior art DWDM network 400 of FIG. 4, each customer (i.e. each connection) is assigned a dedicated wavelength channel for service and protection. As such, each customer (i.e., each connection) requires two service optical transceivers (OTs) for the working path, and two protection OTs for the protection path. As in the prior art DWDM network 100 of FIG. 1, with sixteen customers (i.e., connections), the total number of required OTs in the prior art DWDM network 400 of FIG. 4 is ninety-six when using a 1:1 protection scheme.

Figure 5:
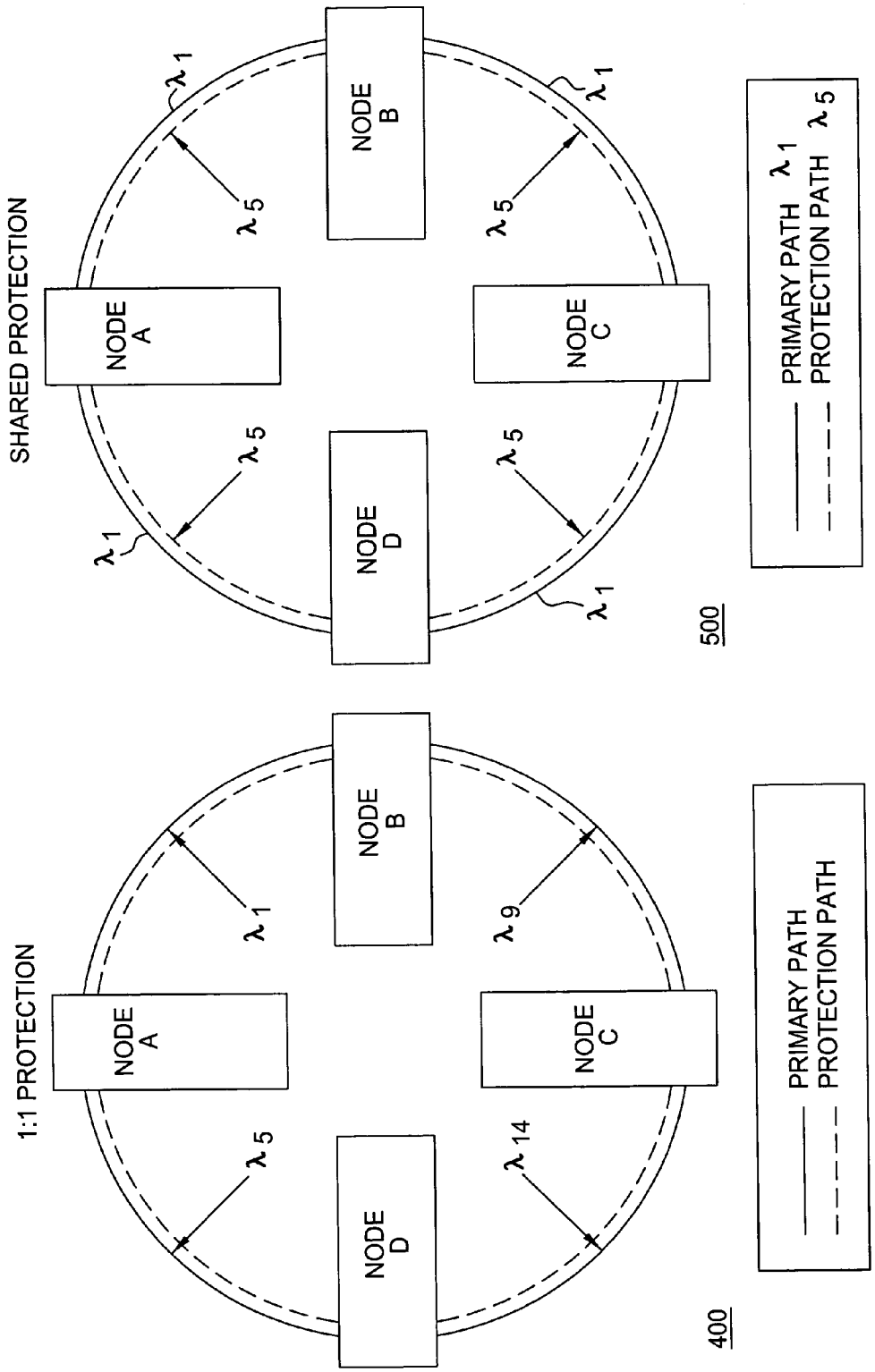
FIG. 5 depicts a high level block diagram of an optically protected DWDM network where not all traffic is next-neighbor implementing a shared protection scheme according to one embodiment of the present invention.

FIG. 5 depicts a high level block diagram of an optically protected DWDM network, of the type of which not all traffic is next-neighbor (i.e., some traffic spans at least three nodes). The DWDM network 500 of FIG. 5 comprises four nodes A, B, C, D and sixteen customers (connections). In the network 500 depicted in FIG. 5, the solid lines represent service paths and the dashed lines represent protection paths. To assist in the explanation of the shared protection scheme of at least this embodiment of the present invention, the prior art DWDM network 400 is also depicted in FIG. 5. However, in the DWDM network 400 depicted in FIG. 5, only a first group of four wavelength channels, $\lambda_1$, $\lambda_5$, $\lambda_9$ and $\lambda_{13}$, which represent the service and protection connections for four connections (customers), is depicted. The four wavelength channels, $\lambda_1$, $\lambda_5$, $\lambda_9$ and $\lambda_{13}$, depicted in the DWDM network 400 of FIG. 5 however are not randomly grouped but are grouped in accordance with the present invention as connections that do not have overlapping paths, which is described in detail below. Although in FIG. 5, the concepts of the present invention are being described with respect to a DWDM network, it will be appreciated by those skilled in the art informed by the teachings of the present invention, that the concepts of the present invention may be applied to optically protected networks implementing other multiplexing schemes, such as conventional wavelength division multiplexing (WDM) or coarse wavelength division multiplexing (CWDM) schemes.

In a network, such as the DWDM network 500 of FIG. 5, wherein not all traffic is next-neighbor, path overlap may exist between connections originating at different nodes. As such, grouping of wavelengths must be accomplished by associating service connections which do not overlap. For example and as depicted in the prior art DWDM network 400 of FIG. 5 and Table 2, the wavelength channel $\lambda_5$ is dedicated for a single customer's traffic between Node A and Node D. Similarly, the wavelength channel $\lambda_1$ is dedicated for a single customer's traffic between Node A and Node B, the wavelength channel $\lambda_9$ is dedicated for a single customer's traffic between Node B and Node C, and the wavelength channel $\lambda_{14}$ is dedicated for a single customer's traffic between Node C and Node D. These 4 services do not overlap and, as such, may be grouped together in accordance with the present invention such that a common wavelength may be used for service, and another wavelength may be used for protection. As such, connections requiring traffic from Node A to Node D, from Node B to Node C, from Node C to Node D, and from Node A to Node B may be serviced by a wavelength in common because no path overlap exists.

As such, and as depicted in the DWDM network 500 of FIG. 5 of the present invention, the four services and protection for the four customers previously provided by the wavelength channels $\lambda_1$, $\lambda_5$, $\lambda_9$ and $\lambda_{14}$ in the prior art network 400 of FIG. 5 may be provided using only two wavelength channels (illustratively wavelength channels $\lambda_1$, and $\lambda_5$) in the DWDM network 500 of FIG. 5 implementing the shared protection scheme of the present invention. More specifically, the first wavelength channel, $\lambda_1$, is used for providing the four grouped, non-overlapping service connections (e.g., a connection from Node A to Node B, a connection from Node A to Node D, a connection from Node B to Node C, and a connection from Node C to Node D), while $\lambda_5$ is used to provide the protection channel. Therefore, the remaining wavelength channels, $\lambda_9$ and $\lambda_{14}$ are made available for servicing other connections.

In the shared protection scheme of the present invention, the second wavelength, $\lambda_5$, is used for providing the protection path for the four connections. More specifically, the second wavelength, $\lambda_5$, is used to provide a protection path for the connection between Node A and Node B by providing a communication path from Node A, thru Node D, thru Node C, to Node B. Similarly, the second wavelength, $\lambda_5$, is also used for providing the protection paths for the remaining three connections as described above. Optionally, the second wavelength, $\lambda_5$, can be used to service interruptable traffic (service connections) during time periods when protection of the service connections is not required. Such service connections are interrupted when the wavelength channels used to provide such service connections are required to provide protection paths for failed service connections.

Figure 6:
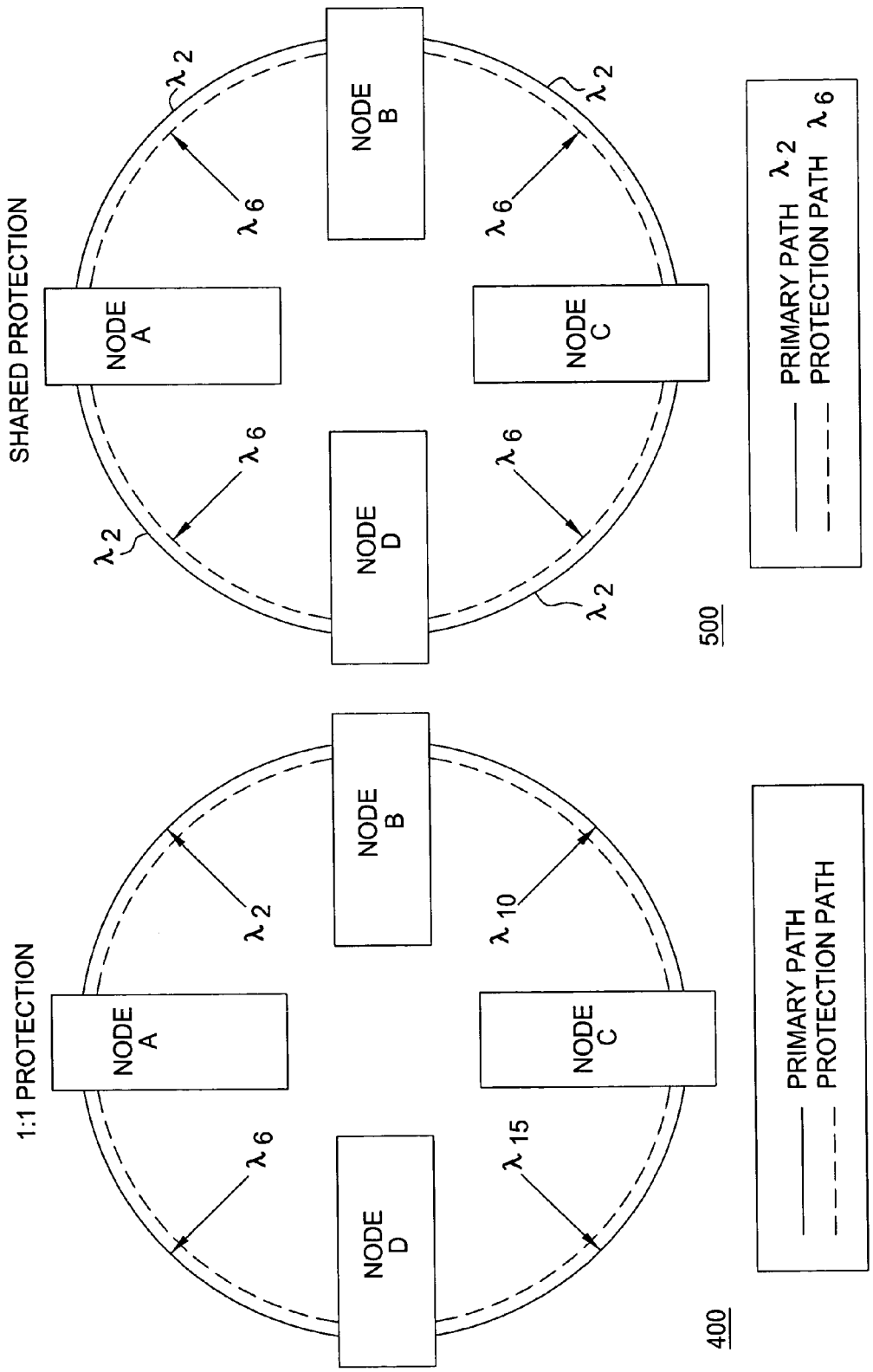
FIG. 6 depicts the DWDM network of FIG. 5 implementing an embodiment of the shared protection scheme of the present invention with reference to a second group of wavelength channels grouped according to one embodiment of the present invention.

Similarly, FIG. 6 depicts the DWDM network 500 of the present invention implementing an embodiment of the shared protection scheme in accordance with the present invention with reference to a second group of four wavelength channels, $\lambda_2$, $\lambda_6$, $\lambda_{10}$ and $\lambda_{15}$, which represent the service and protection connections for four different customers, grouped according to one embodiment of the present invention. Again, to assist in the explanation of the shared protection scheme of at least FIG. 6, the prior art DWDM network 400 is also depicted in FIG. 6. However, in the DWDM network 400 depicted in FIG. 6, only the second group of four wavelength channels, $\lambda_2$, $\lambda_6$, $\lambda_{10}$ and $\lambda_{15}$, which represent the service and protection connections for four connections (customers), is depicted. The four wavelength channels, $\lambda_1$, $\lambda_5$, $\lambda_9$ and $\lambda_{13}$, depicted in the DWDM network 400 of FIG. 6 however are again not randomly grouped but are grouped in accordance with the present invention as connections that do not have overlapping paths.

In the DWDM network 500 depicted in FIG. 6, the same four services and protection paths associated with wavelength channels, $\lambda_2$, $\lambda_6$, $\lambda_{10}$ and $\lambda_{15}$, are provided as in the prior art network 400 of FIG. 6, however in the DWDM network 500 depicted in FIG. 6, again only two wavelength channels (illustratively wavelength channels $\lambda_2$ and $\lambda_6$) are required for providing the same four service and protection connections for the four customers. More specifically, in the DWDM network 500 depicted in FIG. 6, the four depicted service paths are able to be serviced by $\lambda_2$ while the protection paths are provided by $\lambda_6$. As before, the connections are grouped and reconfigured such that no path overlap exists and the service connections are able to be serviced by a wavelength channel in common. Therefore, the four connections serviced and protected by the four wavelength channels, $\lambda_2$, $\lambda_6$, $\lambda_{10}$ and $\lambda_{15}$, under the 1:1 protection scheme of the prior art DWDM network 400 of FIG. 6 are replaced by grouping the connections together in the DWDM network 500 of FIG. 6 implementing an embodiment of the shared protection scheme of the present invention. As such, the same four connections are serviced and protected by the wavelength channels $\lambda_2$ and $\lambda_6$ under the shared protection scheme of the present invention. Therefore, the remaining wavelength channels, $\lambda_{10}$ and $\lambda_{15}$, are made available for servicing other connections.

Figure 7:
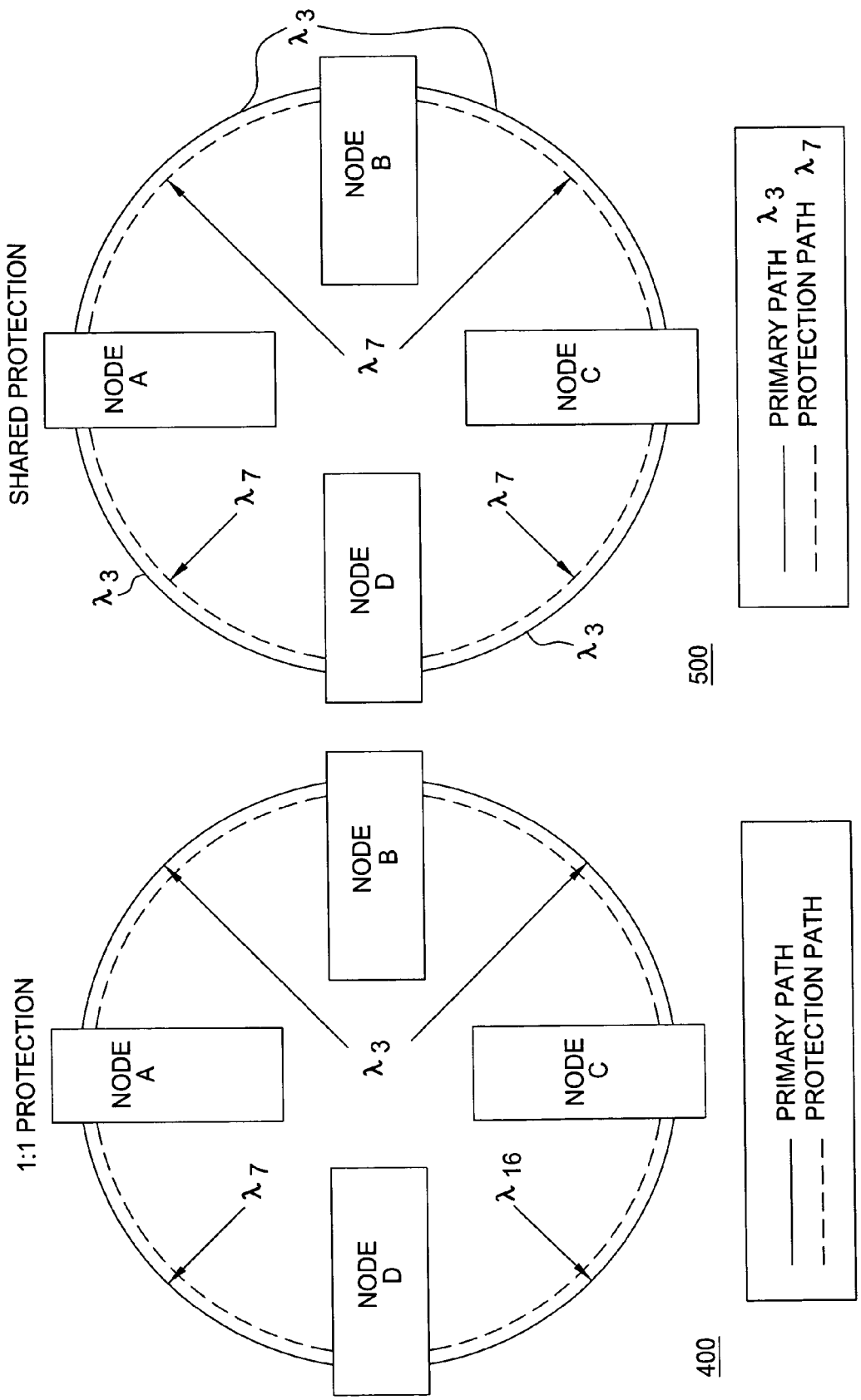
FIG. 7 depicts the DWDM network of FIG. 5 implementing an embodiment of the shared protection scheme of the present invention with reference to a third group of wavelength channels grouped according to one embodiment of the present invention.

FIG. 7 depicts the DWDM network 500 of the present invention implementing an embodiment of the shared protection scheme in accordance with the present invention with reference to a third group of three wavelength channels, $\lambda_3$, $\lambda_7$ and $\lambda_{16}$, which represent the service and protection connections for three different customers, grouped accordance to an embodiment of the present invention. Again, to assist in the explanation of the shared protection scheme of at least FIG. 7, the prior art DWDM network 400 is also depicted in FIG. 7. However, in the DWDM network 400 depicted in FIG. 7, only a third group of three wavelength channels, $\lambda_3$, $\lambda_7$ and $\lambda_{16}$, which represent the service and protection connections for three connections (customers), is depicted. The three wavelength channels, $\lambda_3$, $\lambda_7$ and $\lambda_{16}$, depicted in the DWDM network 400 of FIG. 7 however are again not randomly grouped but are grouped in accordance with the present invention as connections that do not have overlapping paths. However it should be noted that in the DWDM network 400 of FIG. 7, the communication of services between Node A and Node C associated with the first wavelength channel, $\lambda_3$, is configured to propagate from Node A, thru Node B to Node C; the communication of services between Node A and Node D associated with the second wavelength channel, $\lambda_7$, is configured to propagate from Node A to Node D; and the communication of services between Node C and Node D associated with the third wavelength channel, $\lambda_{16}$, is configured to propagate from Node C to Node D, such that no path overlap exists among the connections associated with the three wavelength channels, $\lambda_3$, $\lambda_7$ and $\lambda_{16}$. In the DWDM network 500 depicted of FIG. 7, the same three services and protection associated with wavelength channels, $\lambda_3$, $\lambda_7$ and $\lambda_{16}$, are provided as in the prior art network 400 depicted in FIG. 7, however in the DWDM network 500 of the present invention depicted in FIG. 7, again only two wavelength channels (illustratively wavelength channels $\lambda_3$ and $\lambda_7$) are required for providing the same four service and protection connections for the three customers. More specifically, in the DWDM network 500 of FIG. 7, the three depicted service paths are able to be serviced by $\lambda_3$ while the protection paths are provided by $\lambda_7$. As before, the connections are grouped and reconfigured such that no path overlap exists and the service connections are able to be serviced by a wavelength channel in common. Therefore, the three connections serviced and protected by the three wavelength channels, $\lambda_3$, $\lambda_7$ and $\lambda_{16}$, under the 1:1 protection scheme of the prior art DWDM network 400 of FIG. 7 are replaced by grouping the connections together in the DWDM network 500 of FIG. 7 implementing an embodiment of the shared protection scheme of the present invention. As such, the same three connections are serviced and protected by the wavelength channels $\lambda_3$ and $\lambda_7$ using the shared protection scheme of the present invention as described above. Therefore, the remaining wavelength channel, $\lambda_{16}$, is made available for servicing other connections.

Figure 8:
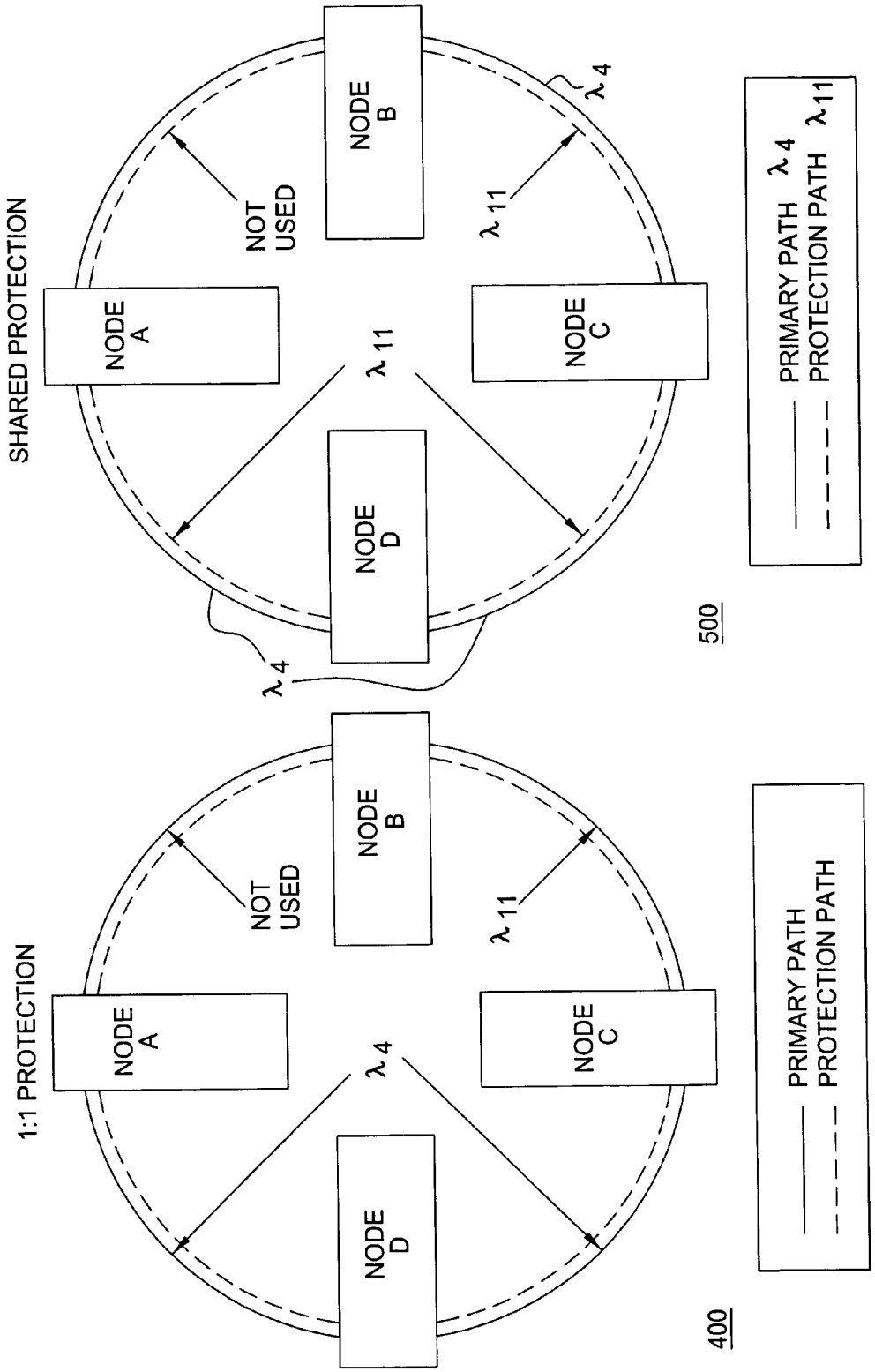
FIG. 8 depicts the DWDM network of FIG. 5 implementing an embodiment of the shared protection scheme of the present invention with reference to a fourth group of wavelength channels grouped according to one embodiment of the present invention.

FIG. 8 depicts the DWDM network 500 of the present invention implementing an embodiment of the shared protection scheme in accordance with the present invention with reference to a fourth group of two wavelength channels, $\lambda_4$ and $\lambda_{11}$, which represent the service and protection connections for two different customers. Again, to assist in the explanation of the shared protection scheme of at least FIG. 8, the prior art DWDM network 400 is also depicted in FIG. 8. However, in the DWDM network 400 depicted in FIG. 8, only a fourth group of two wavelength channels, $\lambda_4$ and $\lambda_{11}$, which represent the service and protection connections for two connections (customers), is depicted. The two wavelength channels, $\lambda_4$ and $\lambda_{11}$, depicted in the DWDM network 400 of FIG. 8 however are again not randomly grouped but are grouped in accordance with the present invention as connections that do not have overlapping paths. It should be noted that in the DWDM network 400 depicted in FIG. 8, the communication of services between Node A and Node C associated with the first wavelength channel, $\lambda_4$, is configured to propagate from Node A, thru Node B to Node C and the communication of services between Node B and Node C associated with the second wavelength channel, $\lambda_{11}$, is configured to propagate from Node B to Node C, such that no path overlap exists among the connections associated with the two wavelength channels, $\lambda_4$ and $\lambda_{11}$.

In the DWDM network 500 depicted in FIG. 8, the same two services and protection are provided as in the prior art network 400 of FIG. 8 and in this instance, the two connections serviced by the two original wavelength channels, $\lambda_4$ and $\lambda_{11}$, remain the same. This group may or may not employ the shared protection scheme of the present invention. However, the benefit of shared protection comes into play when/if another service between Node A and Node B (currently not used) is added. If another service between Node A and Node B is added, all that needs to be done in the DWDM network 500 of FIG. 8 is to add two service OTs (one each in Node A and Node B configured for the wavelength channel $\lambda_4$) and to provision the service using the shared protection scheme of the present invention such that the first wavelength channel, $\lambda_4$, is configured for providing the service connections for the two customers and the second wavelength channel, $\lambda_{11}$, is configured to provide the protection.

Figure 9:
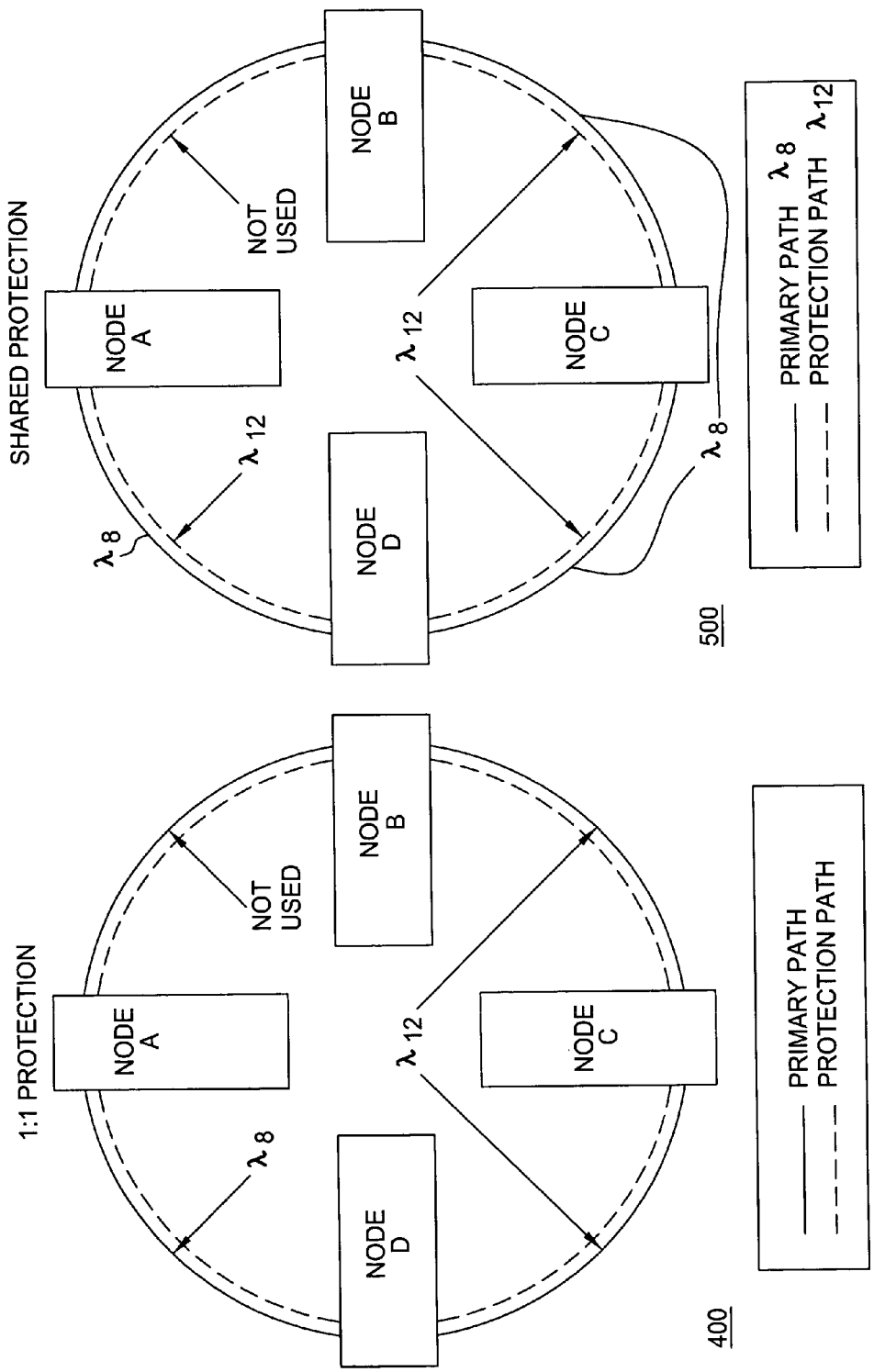
FIG. 9 depicts the DWDM network of FIG. 5 implementing an embodiment of the shared protection scheme of the present invention with reference to a fifth group of wavelength channels grouped in accordance with the present invention.

FIG. 9 depicts the DWDM network 500 of the present invention implementing an embodiment of the shared protection scheme in accordance with the present invention with reference to a fifth group of two wavelength channels, $\lambda_8$ and $\lambda_{12}$, which represent the service and protection connections for two different customers. Again, to assist in the explanation of the shared protection scheme of at least FIG. 9, the prior art DWDM network 400 is also depicted in FIG. 9. However, in the DWDM network 400 depicted in FIG. 9, only a fifth group of two wavelength channels, $\lambda_8$ and $\lambda_{12}$, which represent the service and protection connections for two connections (customers), is depicted. The two wavelength channels, $\lambda_8$ and $\lambda_{12}$, depicted in the DWDM network 400 of FIG. 8 however are again not randomly grouped but are grouped in accordance with the present invention as connections that do not have overlapping paths. It should be noted that in the DWDM network 400 depicted in FIG. 9, the communication of services between Node A and Node D associated with the first wavelength channel, $\lambda_8$, is configured to propagate from Node A to Node D and the communication of services between Node B and Node D associated with the second wavelength channel, $\lambda_{12}$, is configured to propagate from Node B thru Node C to Node D, such that no path overlap exists among the connections associated with the two wavelength channels, $\lambda_8$ and $\lambda_{12}$.

In the DWDM network 500 depicted in FIG. 9 the same two services and protection are provided as in the prior art network 400 of FIG. 9 and again in this instance, the two connections serviced by the two original wavelength channels, $\lambda_8$ and $\lambda_{12}$, remain the same. This group may or may not employ the shared protection scheme of the present invention. Again however, the benefit of shared protection comes into play when/if another service between Node A and Node B (currently not used) is added. If another service between Node A and Node B is added, all that needs to be done in the DWDM network 500 depicted in FIG. 9 is to add two service OTs (one each in Node A and Node B configured for the wavelength channel $\lambda_8$) and to provision the service such that the first wavelength channel, $\lambda_8$, is configured for providing the service connections for the two customers and the second wavelength channel, $\lambda_{12}$, is configured to provide the protection.

Figure 10:
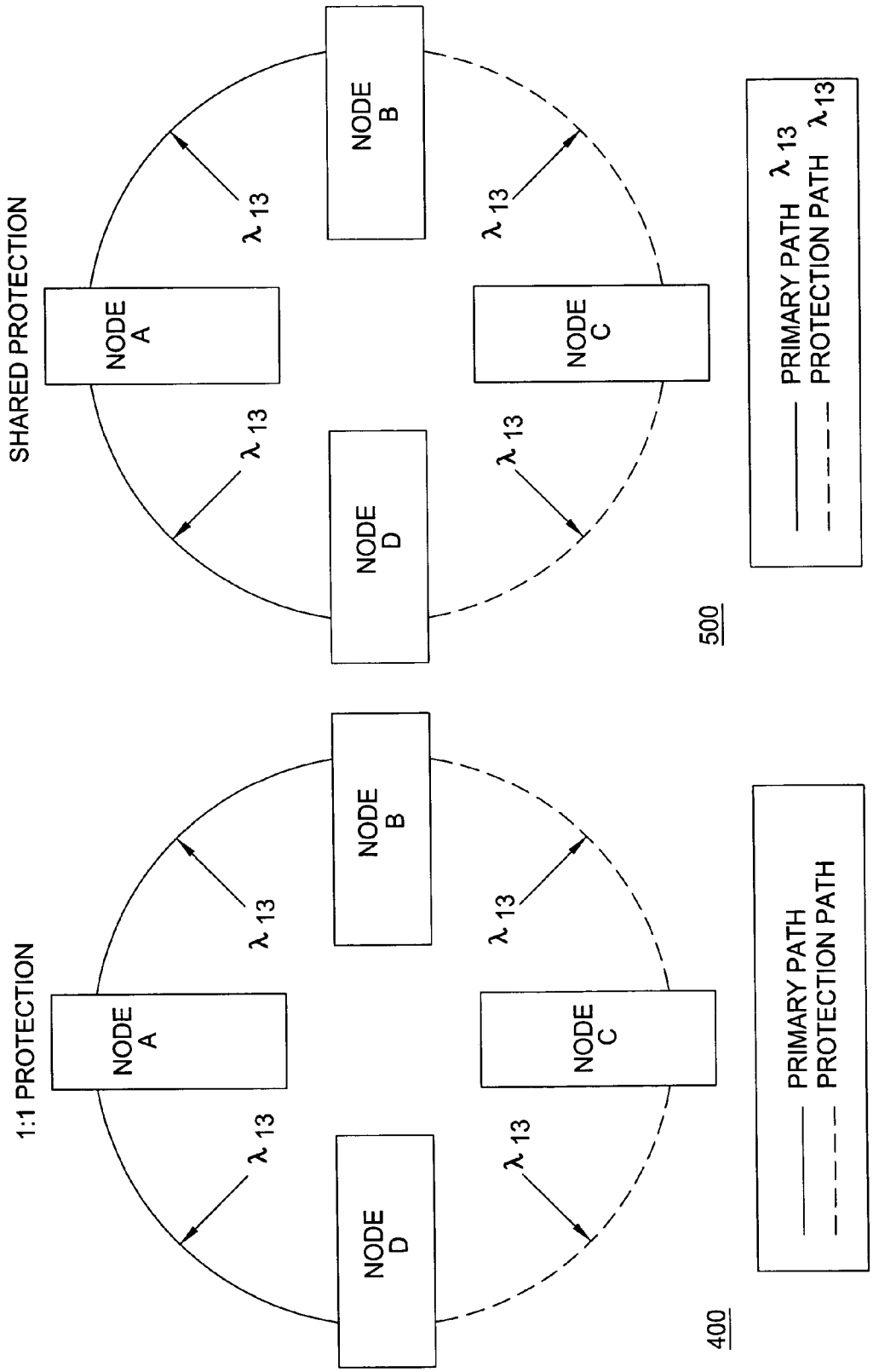
FIG. 10 depicts the DWDM network of FIG. 5 implementing an embodiment of the shared protection scheme of the present invention with reference to a single wavelength channel.

FIG. 10 depicts the DWDM network 500 of the present invention implementing an embodiment of the shared protection scheme in accordance with the present invention with reference to a single wavelength channel, $\lambda_{13}$, which represents the service and protection connections for a final, single customer. In the DWDM network 500 depicted in FIG. 10 the same service and protection are provided as in the prior art network 400 of FIG. 4 and in this instance, the connection serviced by the original wavelength channel, $\lambda_{13}$, remains the same. In the network 500 depicted in FIG. 10, the wavelength channel, $\lambda_{13}$, is configured for providing the service connections for the customers in one direction and to provide the protection in an opposite direction. More specifically, in the network 500 depicted in FIG. 10, the service connection is provided using the wavelength channel, $\lambda_{13}$, from Node B, thru Node A to Node D, and the protection is provided using the wavelength channel, $\lambda_{13}$, from Node B, thru Node C to Node D.

The shared protection scheme of the present invention reduces the number of required wavelength channels required to service and protect sixteen customers (i.e., connections) in a DWDM network, such as the prior art DWDM network 400 of FIG. 4, from sixteen wavelength channels to eleven wavelength channels thus freeing 5 wavelength channels. In addition, the number of required OTs for servicing sixteen customers (connections) in a DWDM network, such as the prior art DWDM network 400 of FIG. 4, is reduced from ninety-six to seventy-six. Such a reduction in the number of OTs required to service and protect a specific number of connections results in a large reduction in cost for implementing a DWDM network in accordance with the present invention.

Although the groupings of specific service connections associated with respective wavelength channels were depicted in the embodiments of the present invention described above, various other combinations of service connections associated with respective available wavelength channels may be advantageously grouped together in accordance with the shared protection scheme of the present invention such that no path overlap exists within the grouped connections and the service connections within the groups are able to be serviced by a wavelength channel in common. More specifically, hypothetical traffic patterns are presented in the embodiments of the present invention described above, and analysis of what it takes to offer shared protection is presented. In other instances, customers may want to have traffic communicated from Node A through Node B to Node C or from Node A through Node D to Node C. As such, other combinations of service connections and their associated respective wavelength channels may be needed to be grouped together in accordance with the present invention.

Another benefit of shared protection is the ability to make use of the protection wavelengths for preemptible services when the network is in a quiescent state. These preemptible services will be usurped once a disruption in the WDM ring occurs, requiring the protection wavelength to be used for one of the protected service connections. For example, FIG. 5 shows the four connections being serviced and protected by $\lambda_1$ and $\lambda_5$. The wavelength $\lambda_1$ carries the service connections; the wavelength $\lambda_5$ is used to provide protection in the event of a ring disruption. If a fiber break occurs between Node A and Node B, then the service being carried on the connection between Node A and Node B on $\lambda_1$, will be protected by switching the service onto $\lambda_5$ and routing the traffic between Node A thru Node D thru Node C to Node B. $\lambda_5$ would now be employed to carry the service between Node A and Node B. Services carried on $\lambda_1$, between Node A and Node D, between Node D and Node C, and between Node C and Node B would not be affected. When the ring is under quiescent (no problem on the ring), then preemptible services can be deployed which will make use of the idle protection channel $\lambda_5$.

Figure 11:
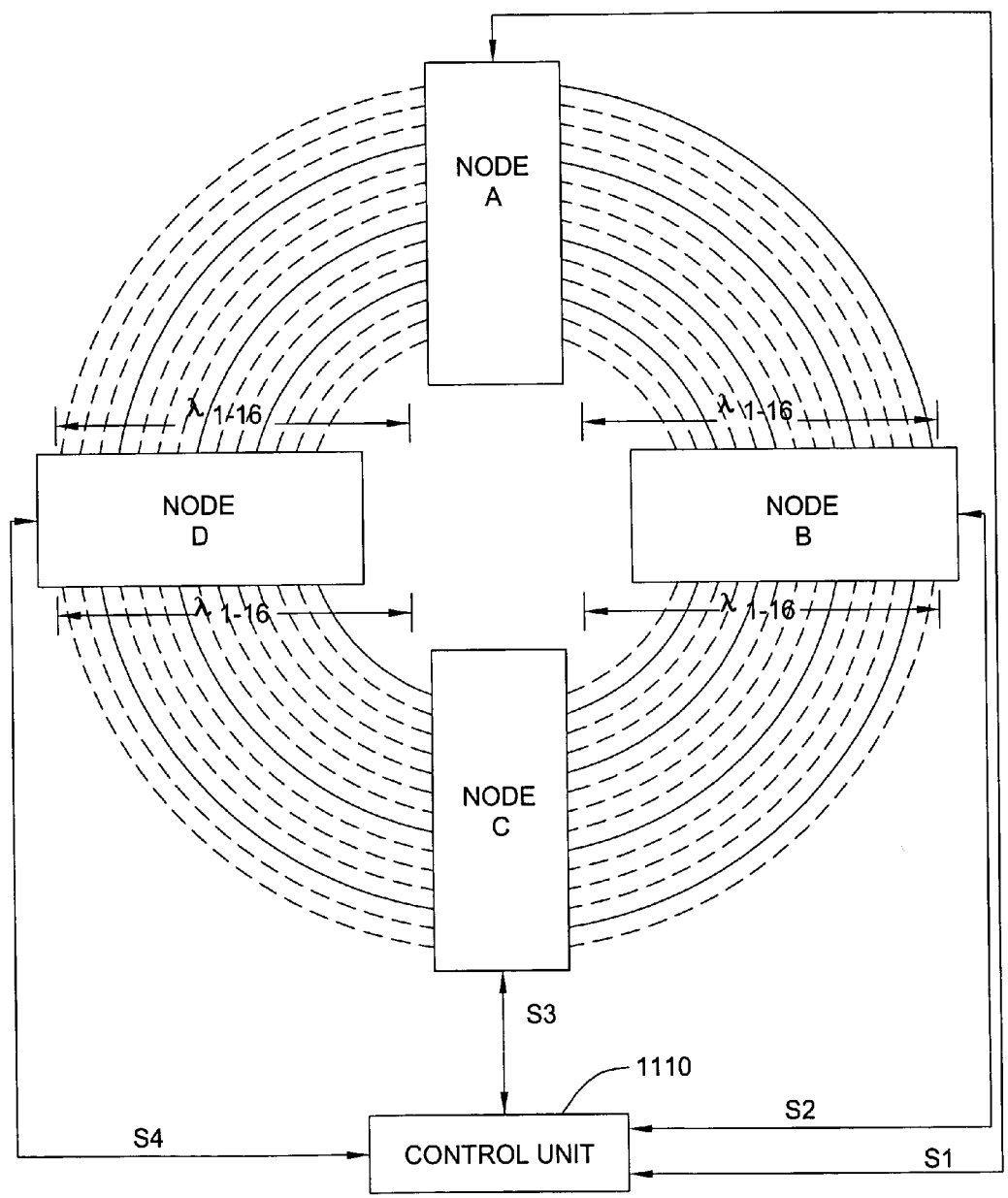
FIG. 11 depicts a high level block diagram of an optically protected WDM network implementing a shared protection scheme according to an alternate embodiment of the present invention.

FIG. 11 depicts a high level block diagram of an optically protected WDM network implementing a shared protection scheme according to an alternate embodiment of the present invention. The network 1100 of FIG. 11 illustratively comprises four nodes, A, B, C and D, and a control unit 1110. The control unit 1110 is in communication with each of the nodes, A, B, C and D, and is adapted to execute the shared protection scheme of the present invention within the network 1100 of FIG. 11. More specifically, the control unit 1110 monitors the requested traffic connections on the network 1100 and groups the request for connections such that a wavelength reuse in the network 1100 is maximized. That is, the control unit 1110 assigns a specific wavelength channel in common to fulfill the connection requests that have non-overlapping paths. The control unit 1110 continuously monitors and groups the connection requests, in accordance with the present invention as described above, to maximize a wavelength reuse in the network 1100 and configures each of the four nodes, A, B, C, and D, to communicate using the determined, assigned respective wavelength channels. In addition and in accordance with the present invention and as described above, the control unit 1110 also assigns a respective common wavelength channel to establish a shared protection path for each of the groups of connections determined by the control unit 1110.

Figure 12:
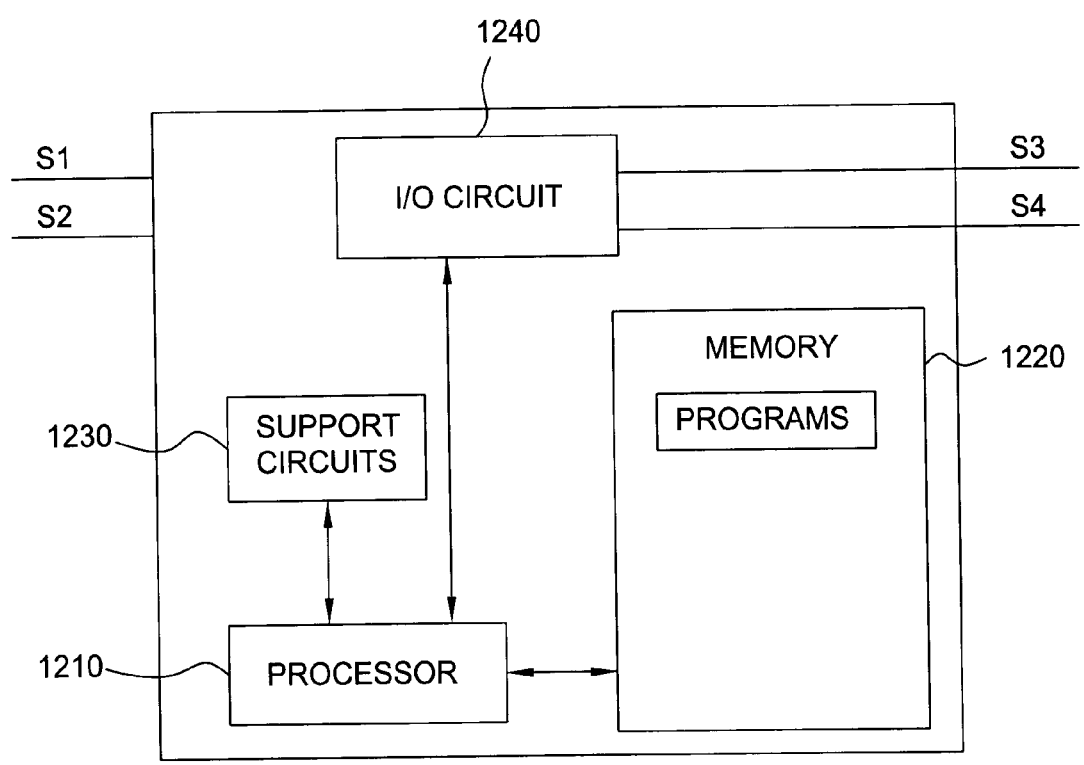
FIG. 12 depicts a high-level block diagram of an embodiment of a control unit suitable for use in the optically protected WDM network of FIG. 11.

FIG. 12 depicts a high-level block diagram of one embodiment of a control unit suitable for use in the optically protected WDM network 1100 of FIG. 11. The control unit 1110 of FIG. 12 illustratively comprises a processor 1210 as well as a memory 1220 for storing control programs and information. The processor 1210 cooperates with conventional support circuitry 1230 such as power supplies, clock circuits, cache memory and the like as well as circuits that assist in executing the software routines stored in the memory 1220. As such, it is contemplated that some of the process steps discussed herein as software processes may be implemented within hardware, for example, as circuitry that cooperates with the processor 1210 to perform various steps. The control unit 1110 also contains input-output circuitry 1240 that forms an interface between the various functional elements communicating with the control unit 110. For example, in the network 1100 of FIG. 11, the control unit 1110 communicates with Node A via a signal path Si, with Node B via a signal path S2, via Node c via a signal path S3, and with Node D via a signal path S4.

Although the control unit 1110 of FIG. 12 is depicted as a computer program product in which a general purpose computer is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

Although in the embodiments of the present invention described above only a single common wavelength channel was assigned to each group for establishing the service connections and only a single common wavelength channel was assigned to each group for establishing the protection paths, it will be appreciated by those skilled in the art informed by the teachings of the present invention that more than one wavelength channel for each group may be assigned for establishing the service connections of each group and that more than one wavelength channel for each group may be assigned for establishing the protection paths of each group.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method for allocating a plurality of wavelength channels within an optically protected wavelength-division-multiplexed (WDM) network, said WDM network supporting a plurality of service connections, the method performed by a control unit adapted to communicate with nodes within the WDM network, said method comprising:
   grouping service connections into respective service channel group of non-overlapping paths from next-neighbor traffic and of overlapping paths between connections originating at nodes other than next-neighbor traffic;
   for each service channel group of non-overlapping paths, assigning at least one common wavelength channel for establishing the service connections;
   for each service channel group of overlapping paths, assigning remaining wavelength channels for servicing said overlapping paths; and
   assigning at least one common wavelength channel for establishing a shared protection path for each service channel group of non-overlapping paths and remaining overlapping paths, wherein said at least one common wavelength channel for establishing a shared protection path is different from said at least one common wavelength channel for establishing the service connections of non-overlapping paths.

2. The method of claim 1, wherein wavelength channels assigned for establishing shared protection paths are used for providing service connections when not in use as shared protection paths.

3. The method of claim 2, wherein service connections established using wavelength channels originally assigned for establishing shared protection paths are interruptable.

4. The method of claim 2, wherein a service connection established using a respective wavelength channel originally assigned for establishing a shared protection path is dropped when said wavelength channel is needed for establishing a shared protection path.

5. The method of claim 1, wherein said service connections are grouped such that wavelength reuse in said network is maximized.

6. An apparatus for use in an optically protected wavelength-division-multiplexed (WDM) network, said WDM network supporting a plurality of service connections, said apparatus including a memory for storing program instructions and a processor for executing said instructions, said processor configured to:
   group service connections into respective service channel group of non-overlapping paths from next-neighbor traffic and of overlapping paths between connections Originating at nodes other than next-neighbor traffic;
   for each service channel group of non-overlapping paths, assign at least one common wavelength channel for establishing the service connections;
   for each service channel group of overlapping paths, assign remaining wavelength channels for servicing said overlapping paths; and
   assign at least one common wavelength channel for establishing a shared protection path for each service channel group of non-overlapping paths and remaining overlapping paths, wherein said at least one common wavelength channel for establishing a shared protection path is different from said at least one common wavelength channel for establishing the service connections of non-overlapping paths.

7. The apparatus of claim 6, wherein said apparatus is further adapted to:
   establish service connections using said wavelength channels assigned for establishing shared protection paths when said wavelength channels are not in use as shared protection paths.

8. The apparatus of claim 7, wherein said apparatus is further adapted to:
   drop a service connection established using a respective wavelength channel originally assigned for establishing a shared protection path when said wavelength channel is needed for establishing a shared protection path.

9. A non-transitory computer-readable medium storing a set of instructions, which when executed by a processor perform a method comprising:
   grouping service connections for an optically protected wavelength-division-multiplexed (WDM) network into respective service channel group of non-overlapping paths from next-neighbor traffic and of overlapping paths between connections originating at nodes other than next-neighbor traffic;
   for each service channel group of non-overlapping paths, assigning at least one common wavelength channel for establishing the service connections;
   for each service channel group of overlapping paths, assigning remaining wavelength channels for servicing said overlapping paths; and
   assigning at least one common wavelength channel for establishing a shared protection path for each service channel group of non-overlapping paths and remaining overlapping paths, wherein said at least one common wavelength channel for establishing a shared protection path is different from said at least one common wavelength channel for establishing the service connections of non-overlapping paths.

10. A non-transitory computer program product having computer instructions stored on fixed or removable non-transitory media, which when executed by a computer, cause the computer to perform a method comprising:
  grouping service connections for an optically protected network into respective service channel group of non-overlapping paths from next-neighbor traffic and of overlapping paths between connections originating at nodes other than next-neighbor traffic;
  assigning, for each service channel group of non-overlapping paths, at least one common wavelength channel for establishing the service connections;
  assigning remaining wavelength channels for servicing said overlapping paths for each service channel group of overlapping paths; and
  assigning at least one common wavelength channel for establishing a shared protection path for each service channel group of non-overlapping paths and remaining overlapping paths, wherein said at least one common wavelength channel for establishing a shared protection path is different from said at least one common wavelength channel for establishing the service connections of non-overlapping paths.

11. An optically protected wavelength-division-multiplexed (WDM) network, comprising:
  a plurality of nodes, said nodes intercommunicating via a plurality of available wavelength channels; and
  a control unit including a memory for storing program instructions and a processor for executing said instructions, said control unit configured to perform the steps of:
  grouping service connections into respective service channel group of non-overlapping paths from next-neighbor traffic and overlapping paths between connections originating at nodes other than next-neighbor traffic;
  for each service channel group of non-overlapping paths, assigning at least one common wavelength channel for establishing the service connections;
  for each service channel group of overlapping paths, assigning remaining wavelength channels for servicing said overlapping paths; and
  assigning at least one common wavelength channel for establishing a shared protection path for each service channel group of non-overlapping paths and remaining overlapping paths, wherein said at least one common wavelength channel for establishing a shared protection path is different from said at least one common wavelength channel for establishing the service connections of non-overlapping paths.

\* \* \* \* \*